Nov. 20, 1956 A. M. LEVINE ET AL 2,771,507

SELF-GATING SYNCHRONIZING CIRCUIT

Filed Oct. 2, 1953

INVENTORS
ARNOLD M. LEVINE
HARRY ALTMAN
BY
Ernest Zanuick
ATTORNEY

United States Patent Office 2,771,507

Patented Nov. 20, 1956

2,771,507

SELF-GATING SYNCHRONIZING CIRCUIT

Arnold M. Levine, River Edge, and Harry Altman, Belleville, N. J., assignors to International Telephone and Telegraph Corporation, Nutley, N. J., a corporation of Maryland Application October 2, 1953, Serial No. 386,810

4 Claims. (Cl. 178—69.5)

Figure 1:
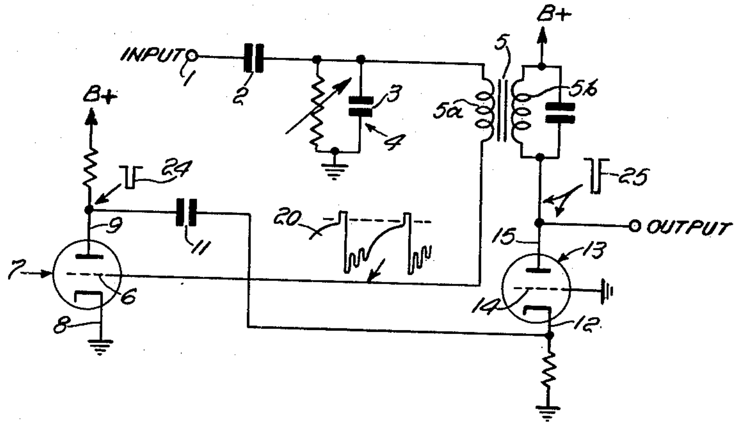

This invention relates to improvements in synchronizing circuits such as, for example, those used in television receivers and more particularly it relates to synchronizing circuits used in television receivers in which local means are employed to generate a synchronizing pulse in response to the transmitted synchronizing signals.

With the expansion of television station coverage and the signal-to-noise improvement in television receivers, many suburban areas which heretofore were unable to receive television transmissions are now able to view television. However, in many of these regions it is extremely difficult to obtain satisfactory synchronization, especially under weak and noisy signal conditions because the television receivers are extremely sensitive to any decay in the quality of the transmitted synchronizing signal. In most television receivers it is common to employ a synchronous oscillator, such as one of the blocking oscillator variety, responsive to the transmitted synhcronizing signals to obtain pulses of sufficient energy content to initiate synchronization within the receiver. Such a device may be operated at a frequency which is appreciably different from that of the occurrence of the transmitted synchronizing signals. However, by virtue of the introduction of the detected synchronizing signal, the oscillator is triggered and generates synhcronizing pulses of considerably greater energy content than the detected synchronous signals, but the generated pulses recur at equal time intervals with the received synchronizing signals. These locally generated pulses are far more effective than the received signals in synchronizing the television receiver because of their higher energy content. Of course, it is necessary to guard against the triggering of the oscillator by noise or interference signals and yet make sure that the oscillator will be responsive to weakly received synchronizing signals.

One disadvantage in such a system derives from the fact that the free period of the blocking oscillator may tend to vary during operation to such an extent that the device is no longer capable of being synchronized or "locked in" with the received synchronizing signals so as to generate a pulse signal corresponding to each and every received signal. Alternately, the received synchronizing signal may be so small or decayed that it is ineffective in initiating or triggering the oscillator action.

One of the objects of this invention therefore is to provide a synchronizing oscillator having a greater immunity to spurious noise signals.

Another object of this invention is to provide a synchronizing oscillator having a high stability so as not to be affected by variations in the supply voltage or input signals.

A further object of this invention is to provide a synchronizing oscillator wherein the received synchronous signals effect a change in the oscillator sensitivity curve so as to cut down the time region during which the oscillator is susceptible to being fired.

A feature of this invention is the use of a highly stable blocking oscillator which is triggered by the received synchronizing signal. The received signal is also utilized to determine a gating period during which the oscillator is susceptible of being fired. The received synchronizing signal is coupled to the grid of an electron discharge device having a time constant in its grid circuit. The electron discharge device functions as a limiter-amplifier whose output is amplified in a second electron discharge device and is inductively coupled back to the grid of the first electron discharge along with the synchronizing signals.

Another feature of this invention is the self gating of a blocking oscillator due to coupling the output of a limiter-amplifier electron discharge device to an amplifier whose output is regeneratively coupled back to the limiter-amplifier whereby the limiter-amplifier is capable of firing only during that portion of time during which the output of the amplifier is coupled into it.

Figure 2:
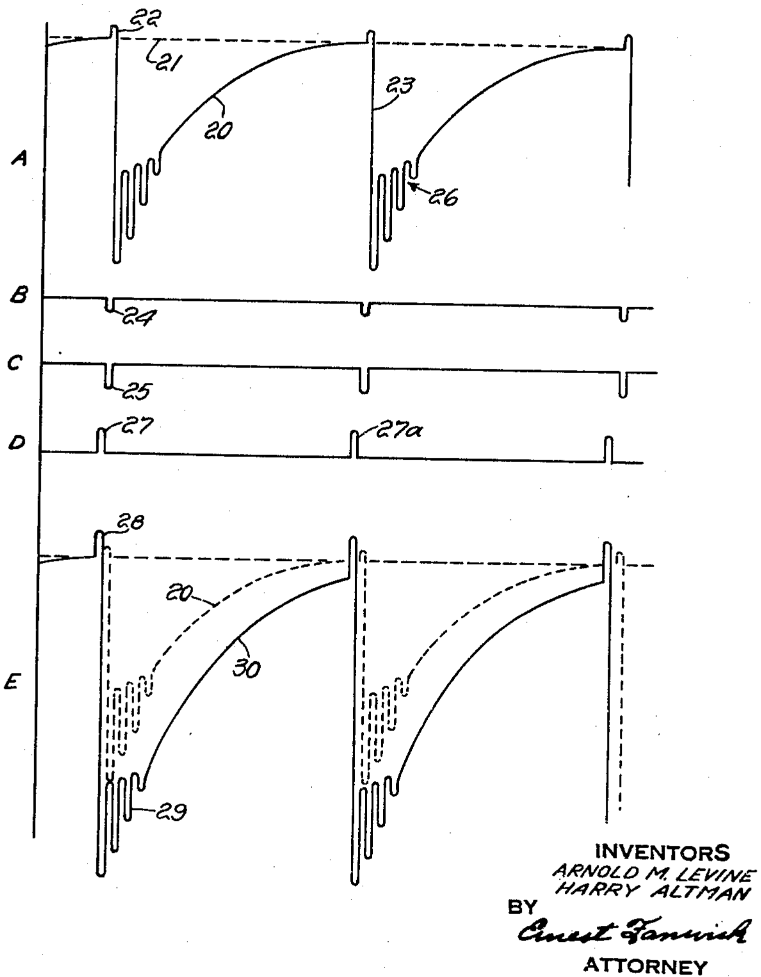

The above-mentioned and other features and objects of this invention will become more apparent by reference to the following description taken in conjunction with the accompanying drawings, in which:

Fig. 1 is a circuit diagram of one embodiment of a synchronous oscillator of this invention; and Fig. 2 illustrates series of curves helpful in the explanation of the circuit diagram shown in Fig. 1.

Referring to Fig. 1 of the drawing, a synchronizing circuit in accordance with the principles of this invention is shown therein for use as a vertical synchronizing oscillator in a television receiver. The received television signal is detected and the vertical synchronizing signals are coupled to the input terminal 1 to function as a trigger signal for the synchronous oscillator. The input terminal 1 is coupled to capacitor 2, across the resistance-capacitance (R–C) time constant network 4 and through one winding 5*a* of transformer 5 to the grid 6 of the electron discharge device 7 whose cathode 8 is grounded. The plate 9 of tube 7 is coupled by capacitance 11 to the cathode 12 of electron discharge device 13 having a grid 14 which is grounded. The plate 15 of tube 13 is coupled through the second winding 5*b* of transformer 5 to a source of positive bias voltage.

Referring to Fig. 2, curve A, a typical grid voltage-time wave shape found in the circuit of Fig. 1 is shown for a free-running condition, that is when there are no trigger signals coupled to input terminal 1. The exponential portion 20 of curve A is due to the discharge of capacitor 3 in the time constant network 4 and the voltage waveform which is dependent on the time constant varies from a level well below cut-off up to the cut-off voltage level shown by dotted line 21. As the discharge of capacitor 3 reaches the cut-off level 21 the bias on the grid 6 causes tube 7 to conduct as shown by pulse 22 of curve A, Fig. 2. When the tube 7 conducts, its plate output 24, curve B, causes tube 13 to conduct and cause a similar pulse 25, curve C, of greater amplitude to surge through the winding 5*b* of transformer 5. By regenerative action through transformer winder 5*a*, the grid circuit of tube 7 is caused to draw current thereby recharging capacitor 3 negatively as indicated by the portion 23 of curve A. As soon as curve portion 23 drops below cut-off 21 the tube 7 no longer conducts as indicated by its plate output 24. The surge applied to transformer 5 causes a series of damped oscillations to occur in the grid circuit as indicated at 26, curve A.

In accordance with the principle of our invention we adjust the time constant of this RC circuit 4 for a free running frequency slightly lower than the recurrent frequency of the synchronizing pulse signals 27, curve D. As shown in curve E, the tube 7 is caused to conduct earlier than it would during free running operation, and the triggering pulse 27 in addition causes the tube 7 to draw more current as indicated at 28. This results in a corresponding increase in the pulse output of tube 13 thereby increasing the amplitude of the initial oscillations of the transformer as indicated at 29. Due to this additional energy introduced into the grid circuit of tube 7, grid 6 draws more current than it does when in the free running condition, and this results in a greater charge on capacitor 3, thus increasing the negative bias on grid 6 as illustrated by portion 30, curve E, in comparison with portion 20 for free running operation. As capacitor 3 discharges, the exponential curve 30 does not approach as near to the cut-off level by the occurrence of the next triggering pulse 27*a* as it would in the free running condition. As stated above, output of tube 7 is coupled to the cathode 12 of tube 13 where it is amplified and the output of tube 13 is regeneratively coupled to the grid circuit of tube 7 through the transformer 5 increasing the surge when tube 7 conducts in response to a triggering pulse. Due to the increased charge in capacitor 3 causing the exponential curve 30 to be further from the cut-off level, it is apparent that under these conditions the circuit of this invention can only be triggered prior to a synchronizing pulse by a noise pulse of sufficient amplitude to raise the level from the exponential curve 30 to the cut-off level 21. Effectively, the grid voltage bias curve has been lowered in relation to the time of the input synchronizing pulses thereby reducing the chance of the oscillator being triggered by noise energy occurring prior to the trigger pulse.

Should the synchronizing signal be momentarily lost, the oscillator will immediately revert back to its free running condition, thus allowing the recovery time of the oscillator to be raised and resulting in a fast acting system. It has been assumed that proper limiting exists prior to input terminals 1 and this is usually true because the peak noise never exceeds the peak of the synchronous pulses after limiting. Thus, our improved synchronous oscillator is found to reduce the noise susceptibility region to a minimum, and due to its greater stability, it is independent of changes in the supply voltage and filament voltage. Due to the large regenerative pulse gain, the repetition frequency is very high and becomes to a great extent independent of the trigger pulse shape yielding a good interlace characteristic which is substantially independent of the hold control setting.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a television system having synchronizing signals, a blocking oscillator circuit to generate pulse signals having a rate of occurrence comparable to said synchronizing signals comprising a first electron discharge device having at least a cathode, an anode and a grid, a circuit for said grid, a time constant circuit having capacitive and resistive elements coupled to said grid circuit, means to couple said synchronizing signals to said grid circuit, a second electron discharge device having at least a cathode and an anode, means to couple the output from the anode of said first electron discharge device to the cathode of said second electron discharge device and inductive means to couple the output of the anode of said second electron discharge device to said grid circuit of said first electron discharge device.

2. In a television system having synchronizing signals, means to generate pulse signals having a rate of occurrence comparable to said synchronizing signals comprising a first electron discharge device having at least a cathode, an anode and a grid, a circuit for said grid, a time constant circuit have capacitive and resistive elements coupled to said grid circuit, means to couple said synchronizing signals to said grid circuit, a second electron discharge device having at least a cathode and an anode, means to couple the output from the anode of said first electron discharge device to the cathode of said second electron discharge device and means to couple the output of the anode of said second electron discharge device to said grid circuit of said first electron discharge device, said last named means including a coupling transformer having one winding coupled to the anode of said second electron discharge device and a second winding coupled to said grid circuit.

3. In a television system having synchronizing signals, means to generate pulse signals having a rate of occurrence comparable to said synchronized signals comprising a transformer having a first and second winding, a first electron discharge device having at least a cathode, an anode and a grid, said cathode being coupled to ground potential, a circuit for said grid including said first winding, a time constant network having at least a capacitive and resistive element coupled in parallel between said grid circuit and ground potential, a source of input synchronizing signals coupled to said grid circuit, a second electron discharge device having an anode, a cathode and grid, said grid being coupled to ground potential, the anode of said first electron discharge device being coupled to the cathode of said second device, a resistor, said resistor being coupled between the cathode of said second device and ground potential, an output terminal coupled to the anode output of said second electron discharge device and said second winding of said transformer being coupled to the anode of said second device.

4. In a television system having synchronizing signals, a pulse generating circuit of the blocking oscillator type to generate pulse signals having a rate of occurrence comparable to said synchronizing signals comprising an electron discharge device including a grid circuit, a time constant circuit coupled in said grid circuit, means to couple said synchronizing signals to said grid circuit to trigger said device for conduction, means to amplify the signal output of said electron discharge device and conductive coupling means to regeneratively couple said amplified signal output to said grid circuit and thereby minimize the action of spurious voice pulses on the operation of said pulse generating circuit, the means to amplify the signal output of said electron discharge device including a second electron discharge device having at least a cathode, an anode and a grounded grid, means to couple the output from said first-mentioned electron discharge device to the cathode of said second electron discharge device and a transformer to couple the output of said second electron discharge device to said grid circuit, said transformer having one winding coupled in the anode circuit of said second electron discharge device and a second winding in the grid circuit of said first mentioned electron discharge device.

References Cited in the file of this patent

UNITED STATES PATENTS 2,585,930 Gruen ---------------- Feb. 19, 1952